(12) United States Patent
Adachi et al.

(10) Patent No.: US 7,614,795 B2
(45) Date of Patent: Nov. 10, 2009

(54) ROLLING BEARING ASSEMBLY

(75) Inventors: Ken Adachi, Kashiba (JP); Youichi Tsuzaki, Kashiba (JP); Masaru Deguchi, Kashihara (JP); Tetsuya Ishikawa, Kashiwara (JP)

(73) Assignee: JTEKT Corporation, Osaka (JP)

( * ) Notice: Subject to any disclaimer, the term of this patent is extended or adjusted under 35 U.S.C. 154(b) by 379 days.

(21) Appl. No.: 11/512,298

(22) Filed: Aug. 30, 2006

(65) Prior Publication Data
US 2007/0201781 A1 Aug. 30, 2007

(30) Foreign Application Priority Data
Aug. 31, 2005 (JP) .............................. 2005-251062

(51) Int. Cl.
*F16C 33/78* (2006.01)
(52) U.S. Cl. ...................................... 384/484; 384/544
(58) Field of Classification Search ................. 384/544, 384/589, 477–487; 277/551, 560, 572
See application file for complete search history.

(56) References Cited
U.S. PATENT DOCUMENTS

| | | | | |
|---|---|---|---|---|
| 3,899,226 A | | 8/1975 | Frost et al. | |
| 4,040,683 A | * | 8/1977 | Korenhof | 384/482 |
| 4,047,770 A | * | 9/1977 | Korenhof et al. | 384/482 |
| 4,647,230 A | * | 3/1987 | Friedrich et al. | 384/510 |
| 5,215,387 A | * | 6/1993 | Bertetti et al. | 384/544 |
| 5,454,647 A | * | 10/1995 | Otto | 384/486 |
| 6,953,193 B2 | * | 10/2005 | Kanzaki | 277/562 |

FOREIGN PATENT DOCUMENTS

| | | | |
|---|---|---|---|
| FR | 2688567 A1 | * | 9/1993 |
| JP | 2001-242188 A | | 9/2001 |
| JP | 2003-148494 A | | 5/2003 |
| JP | 2005-061616 A | | 3/2005 |

* cited by examiner

*Primary Examiner*—Thomas R Hannon
(74) *Attorney, Agent, or Firm*—Birch, Stewart, Kolasch & Birch, LLP

(57) ABSTRACT

A rolling bearing assembly includes: an outer ring member; an inner ring member; a hub wheel formed with a flange at one axial end thereof; and a seal member for sealing a space between one axial end of the outer ring member and an inside surface of the flange, which axially opposes the one end of the outer ring member. The seal member includes: a cylindrical core fitted on the one axial end of the outer ring member and axially extended from the one end toward the flange; and an annular lip portion secured to the core and formed from an elastic material as axially extended from the core to the inside surface of the flange.

10 Claims, 3 Drawing Sheets

ROLLING BEARING ASSEMBLY

FIELD OF THE INVENTION

The present invention relates to a rolling bearing assembly for supporting an automotive driving wheel or driven wheel by way of a bearing.

DESCRIPTION OF THE PRIOR ART

A variety of rolling bearing assemblies have been employed for supporting a road wheel mounted to an automotive driving shaft or to an automotive driven wheel. For instance, front and rear wheels of a heavy off-road vehicle are each mounted to the driving shaft by means of a rolling bearing assembly including two roller bearings disposed in adjoining relation. Known as such a rolling bearing assembly is one which includes, as disclosed in Japanese Unexamined Patent Publication No. 2001-242188 for example, an outer ring member, an inner ring member disposed radially inwardly of the outer ring member in a coaxial relation therewith via rolling elements, and a hub wheel formed with a flange at one axial end thereof and having the inner ring member fitted on an outer periphery thereof. Since a gap exists between one axial end of the outer ring member and an inside surface of the flange, which axially opposes the end of the outer ring member, a seal member is provided for closing the gap.

The seal member disposed in the above rolling bearing assembly is mounted on an inner periphery of the flange-side end of the outer ring member, so that an annular space is formed on an outer side of the seal member. Since the distance between the end of the outer ring member and the inside surface of the flange is so small that water entering the annular space is not drained so as to be accumulated. This leads to a drawback that the bearing assembly is incapable of fully blocking the water invasion inside the seal member.

OBJECT AND SUMMARY OF THE INVENTION

In view of the problem encountered by the prior art, it is an object of the invention to provide a rolling bearing assembly adapted to fully block the water invasion inside the seal member.

For achieving the above object, the invention adopts the following technical means.

A rolling bearing assembly according to the invention comprises: an outer ring member; an inner ring member disposed radially inwardly of the outer ring member in a coaxial relation therewith via rolling elements; a hub wheel formed with a flange at one axial end thereof and having the inner ring member fitted on an outer periphery thereof; and a seal member for sealing as interposed between one axial end of the outer ring member and an inside surface of the flange, which axially opposes the end of the outer ring member, the seal member including: a cylindrical core fitted on the one axial end of the outer ring member and axially extended from the one end toward the flange; and an annular lip portion secured to the core and formed from an elastic material as axially extended from the core to the inside surface of the flange.

According to the rolling bearing assembly of the invention, the space between the flange and the outer ring member is sealed by the seal member comprising the core and the lip portion secured thereto. The core is axially extended from the one axial end of the outer ring member toward the flange, whereas the lip portion is substantially axially extended from the core to the inside surface of the flange. Hence, the seal member is not located radially inwardly from the gap between the outer ring member and the flange, so that the annular space is not formed on the outer side of the seal member. Accordingly, the water is not accumulated on the outer side of the seal member, so that the rolling bearing assembly is adapted to fully block the water invasion inside the seal member.

According to the invention, the lip portion may preferably include an outer slant surface inclined radially inwardly as axially extended from a tip of the lip portion toward the outer ring member. Such an outer slant surface of the lip portion allows the water flowing down on the inside surface of the flange to flow therealong, thus effectively blocking the water invasion from the tip of the lip portion.

Even in the case of the water invasion inside the seal member, the lip portion may be formed with an inner slant surface inclined radially inwardly as axially extended from the tip thereof toward the outer ring member, such that the water flowing to a bottom of the seal member is discharged outside the seal member as guided along the inner slant surface.

According to the invention, the core may preferably be formed with a drain hole at the radially lowermost part thereof such as to drain the water entering inside the seal member. This provides for quick draining of the water entering inside the seal member.

DESCRIPTION OF THE PREFERRED EMBODIMENTS

Figure 1:
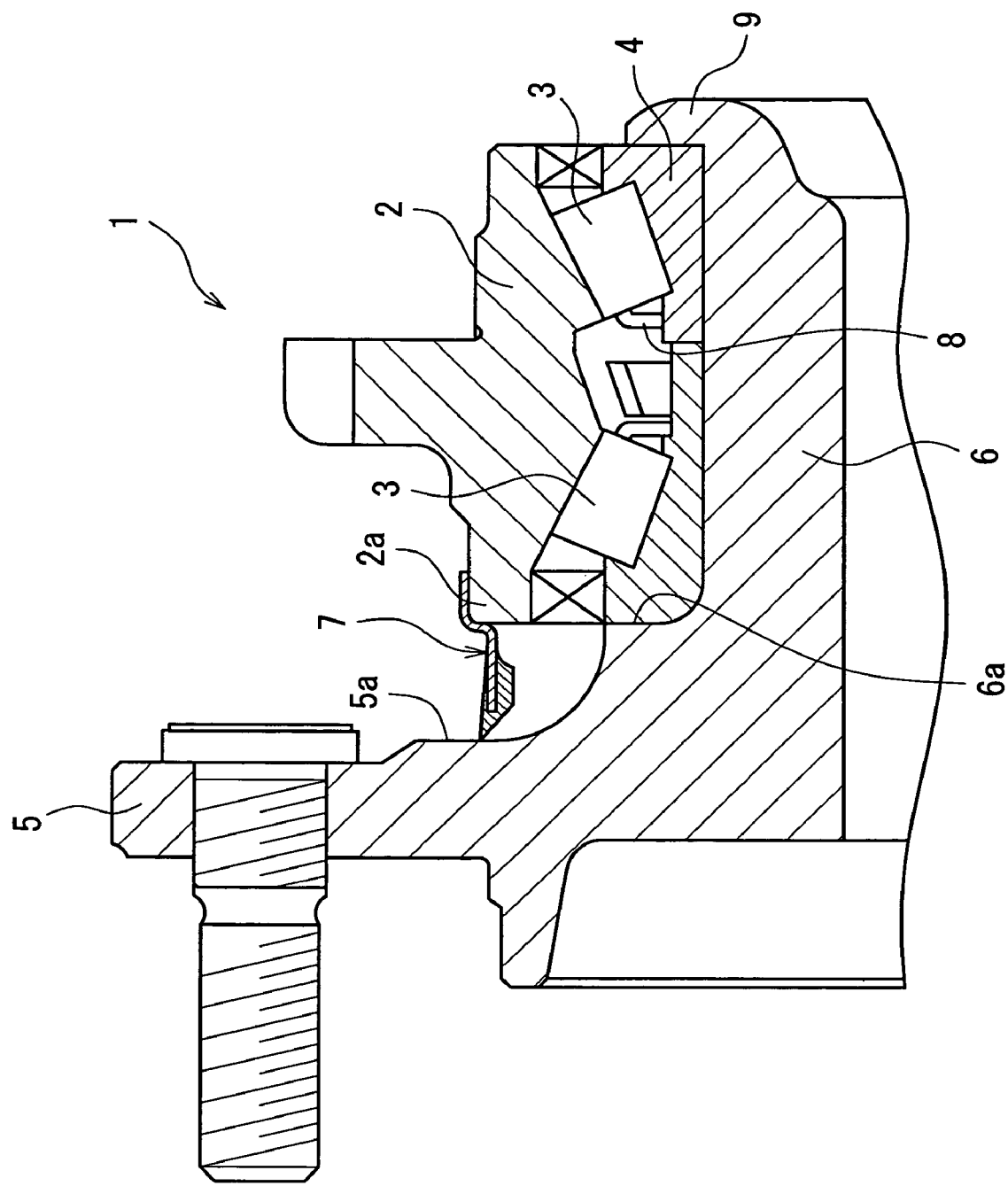
FIG. 1 is a sectional view showing a double-row rolling bearing assembly having a seal member mounted therein.

A preferred embodiment of the invention will hereinbelow be described with reference to the accompanying drawings. FIG. 1 illustrates a rolling bearing assembly 1 according to one embodiment of the invention. The rolling bearing assembly 1 of the embodiment is used as mounted to, for example, a rear wheel of an off-road vehicle. As shown in the figure, the bearing assembly 1 includes: an outer ring member 2; an inner ring member 4 disposed radially inwardly of the outer ring member 2 in a coaxial relation therewith via rolling elements 3; a hub wheel 6 formed with a flange 5 at one axial end thereof and having the inner ring member 4 fitted on an outer periphery thereof; and a seal member 7 for sealing a space between one axial end of the outer ring member 2 and an inside surface 5*a* of the flange, the surface axially opposing the one axial end of the outer ring member.

The hub wheel 6 is formed with a small diameter portion at the outer periphery thereof. The rolling bearing assembly is constructed on the small diameter portion. The rolling bearing assembly is constituted as a double-row tapered roller bearing assembly and includes: a single outer ring member 2 formed with a pair of tapered raceway surfaces which are progressively increased in diameter from a central part of the outer ring member toward axially opposite ends thereof; a pair of inner ring members 4 each formed with an inner raceway opposing each of the outer raceways; a plurality of tapered rollers 3 as rolling elements rollably arranged between the inner raceways and the outer raceways in the opposing relation; and cages 8 for retaining the tapered rollers 3 at predetermined circumferential space intervals. The inner ring members 4 are calked by a calking portion 9 at an axial end of the hub wheel 6, so that the inner ring member is fixed to place as having one end thereof pressed against a step surface 6a.

Figure 2A:
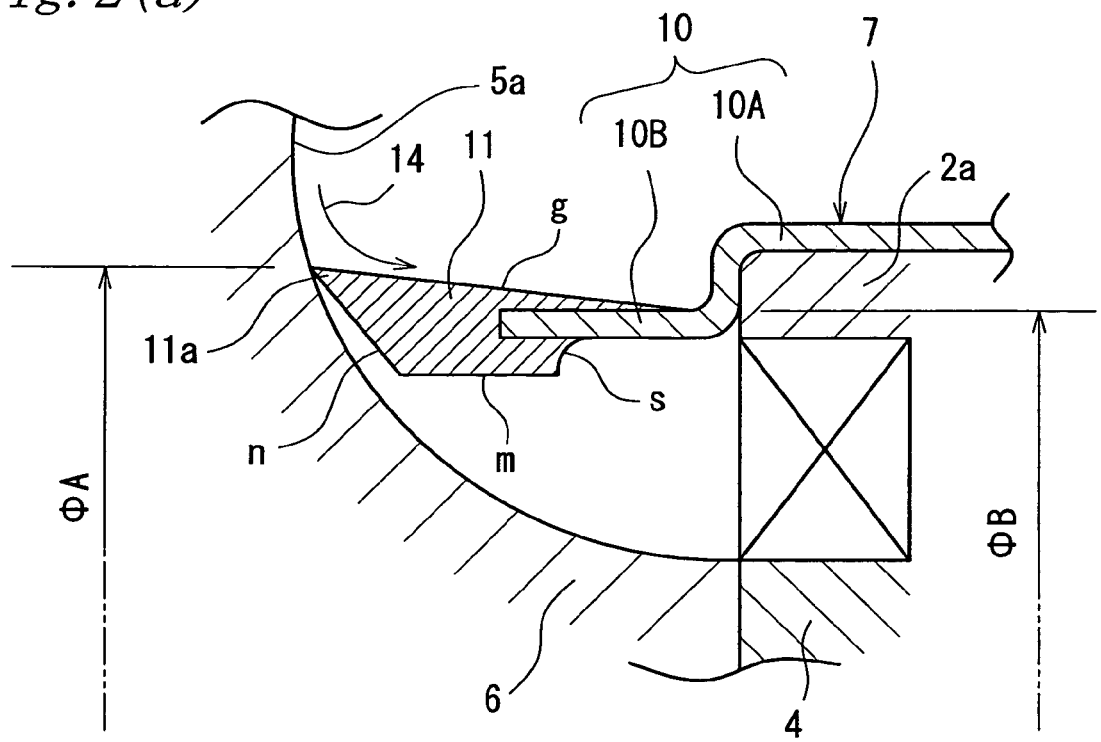
FIG. 2(*a*) is an enlarged sectional view showing a principal part of an upper portion of the seal member, whereas FIG. 2(*b*) is an enlarged sectional view showing an principal part of a lower portion thereof.

As shown in FIG. 2(a), the seal member 7 includes: a core 10 formed in a cylindrical shape; and an annular lip portion 11 formed from an elastic material and secured to the core 10. The core 10 includes: a great diameter portion 10A fitted on an end 2a of the outer ring member; and a main body 10B extended from the end 2a toward the flange. The main body 10B is inserted in the lip portion 11 to an axial center thereof, so as to prevent the lip portion 11 from separating off from the core. The lip portion 11 is secured to the main body 10B in a manner to cover a part of the main body on outer and inner sides thereof. The lip portion is substantially axially extended from the main body 10B to the inside surface 5a of the flange. Furthermore, the lip portion is progressively increased in radial thickness toward the inside surface 5a of the flange. The lip portion contacts the inside surface 5a of the flange at a tip 11a thereof, thereby sealing space between the lip portion 11 and the inside surface 5a of the flange. The lip portion 11 is defined by an outer slant surface g inclined radially inwardly as axially extended from the tip 11a toward the outer ring member 2; an inner slant surface n inclined radially inwardly as axially extended from the tip 11a toward the outer ring member 2; an inner peripheral surface m axially extended from the inner slant surface n toward the outer ring member 2; and an inside surface s raised from the inner peripheral surface m to the main body 10B.

Figure 2B:
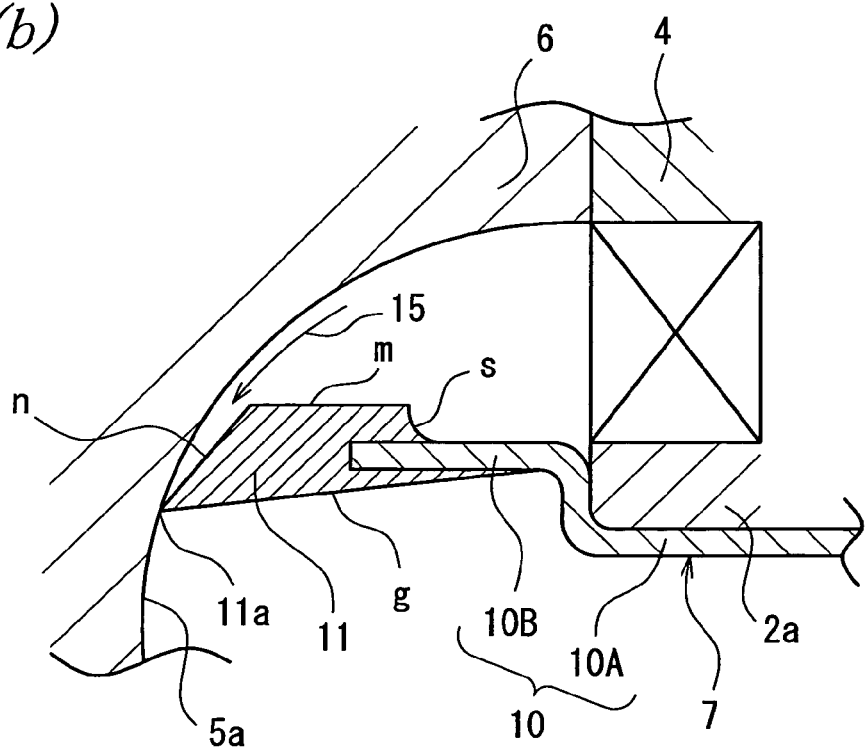

Because of the aforementioned configuration, the seal member 7 is not located radially inwardly from the gap between the outer ring member 2 and the flange 5, so that an annular space to allow water accumulation is not formed on an outer side of the seal member 7. Hence, water flowing to the seal member 7 cannot accumulate. Because of the inclination of the outer slant surface g, the tip 11a of the lip portion is contacted against the inside surface 5a of the flange as directed upwardly with respect to the axial direction rather than directed axially or downwardly with respect to the axial direction. Thus is established a relation A>B, where A denotes a diameter of the tip 11a, and B denotes an outside diameter of the main body 10B. This allows the water flowing down on the inside surface 5a of the flange to flow over the tip 11a and along the outer slant surface g, as indicated by an arrow 14 in FIG. 2(a). Even in a case where the water enters inside the seal member 7 when the state of FIG. 2(a) is vertically inverted by the rotation of the hub wheel 6, the inner slant surface n offers an advantage that the water flowing to a bottom of the seal member 7 is discharged outside the seal member as guided along the inner slant surface n, as indicated by an arrow 15 in FIG. 2(b).

Figure 3:
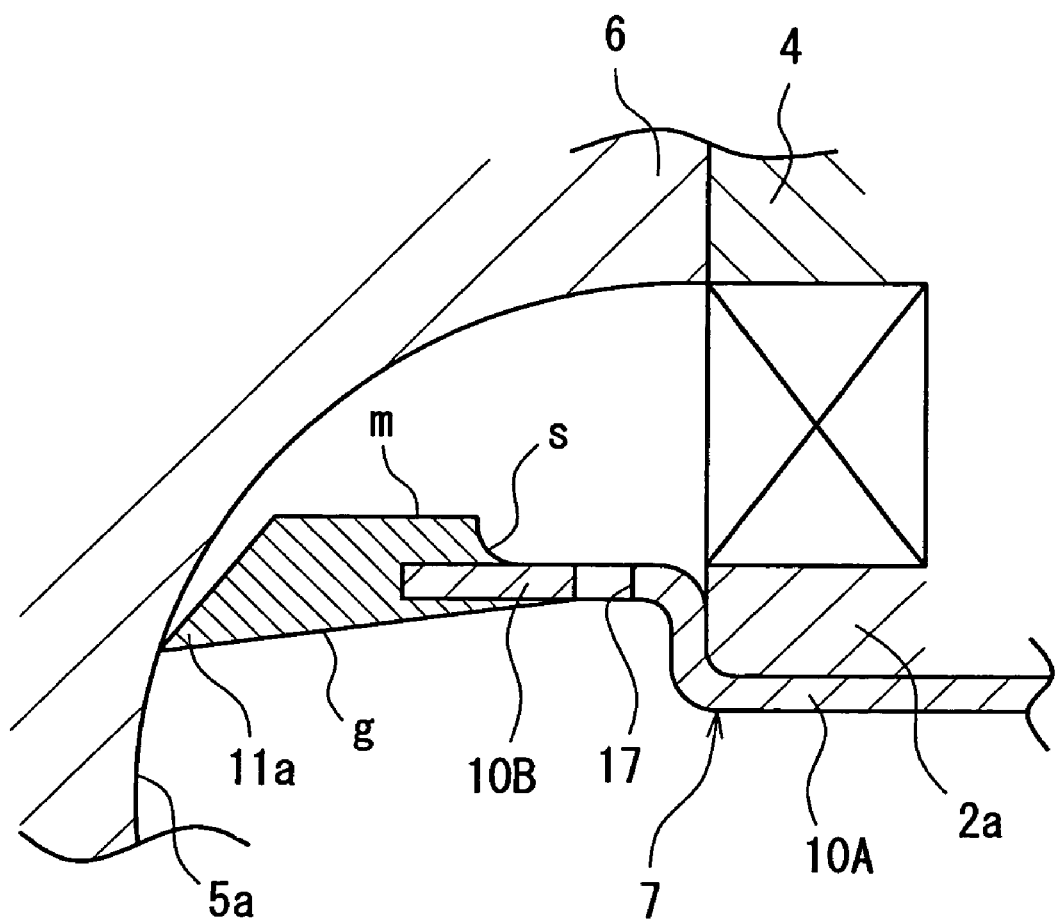
FIG. 3 is an enlarged sectional view showing a principal part of the lower portion of a seal member formed with a drain hole.

According to the rolling bearing assembly 1 of the above embodiment, such an annular space as to allow the water accumulation on the outer side of the seal member 7 is not formed. Furthermore, the provision of the outer slant surface g is effective to prevent the invasion of water from the tip 11a of the lip portion. Even if the water enters inside the seal member 7, the bearing assembly is adapted to drain the water. It is to be noted that the invention is not limited to the foregoing embodiment. As shown in FIG. 3, for example, the main body 10B may be formed with a drain hole 17 at the radially lowermost part thereof such as to drain the water entering inside the seal member 7. The drain hole 17 is disposed at place near the end 2a of the outer ring member and away from the lip portion 11. Such a drain hole 17 provides for quick draining of the water entering inside the seal member 7. The configuration and the like of the outer ring member, the inner ring member, the rolling element, the hub wheel or the like are not limited to the foregoing embodiment.

What is claimed is:

1. A rolling bearing assembly comprising:
   an outer ring member;
   an inner ring member disposed radially inwardly of the outer ring member in a coaxial relation therewith via rolling elements;
   a hub wheel formed with a flange at one axial end thereof and having the inner ring member fitted on an outer periphery thereof; and
   a seal member for sealing being interposed between one axial end of the outer ring member and an inside surface of the flange axially opposing the one axial end of the outer ring member, the seal member including:
      a cylindrical core fitted on the one axial end of the outer ring member and axially extending from the one axial end toward the flange; and
      an annular lip portion secured to the core and formed from an elastic material, the annular lip extending substantially axially from the core to the inside surface of the flange,
   wherein the core includes:
      a greater diameter portion fitted on an outer surface of the outer ring member at the one end, and
      a stepped portion as a main body having a smaller diameter than the greater diameter portion, the stepped portion axially extending toward the flange.

2. The rolling bearing assembly according to claim 1, wherein the lip portion includes an outer slant surface inclined radially inwardly as axially extended from a tip of the lip portion toward the outer ring member.

3. The rolling bearing assembly according to claim 2, wherein the lip portion includes an inner slant surface inclined radially inwardly as axially extended from a tip of the lip portion toward the outer ring member.

4. The rolling bearing assembly according to claim 1, wherein the lip portion includes an inner slant surface inclined radially inwardly as axially extended from a tip of the lip portion toward the outer ring member.

5. The rolling bearing assembly according to claim 1, wherein the annular lip is secured to the stepped portion.

6. The rolling bearing assembly according to claim 1, wherein an outer surface of the annular lip portion increases in diameter from the stepped portion toward the inside surface of the flange.

7. The rolling bearing assembly according to claim 6, wherein the annular lip portion is secured to an outer surface of the stepped portion of the core.

8. A rolling bearing assembly comprising:
   an outer ring member;
      an inner ring member disposed radially inwardly of the outer ring member in a coaxial relation therewith via rolling elements;
      a hub wheel formed with a flange at one axial end thereof and having the inner ring member fitted on an outer periphery thereof; and
      a seal member for sealing being interposed between one axial end of the outer ring member and an inside surface of the flange axially opposing the one axial end of the outer ring member, the seal member including:

a cylindrical core fitted on the one axial end of the outer ring member and axially extending from the one axial end toward the flange, the core including a drain hole formed at the radially lowermost part thereof for draining water entering inside the seal member; and an annular lip portion secured to the core and formed from an elastic material, the annular lip extending substantially axially from the core to the inside surface of the flange.

9. A rolling bearing assembly comprising:

an outer ring member;

an inner ring member disposed radially inwardly of the outer ring member in a coaxial relation therewith via rolling elements;

a hub wheel formed with a flange at one axial end thereof and having the inner ring member fitted on an outer periphery thereof; and a seal member for sealing being interposed between one axial end of the outer ring member and an inside surface of the flange axially opposing the one axial end of the outer ring member, the seal member including:

a cylindrical core fitted on the one axial end of the outer ring member and axially extending from the one axial end toward the flange; and an annular lip portion secured to the core and formed from an elastic material, the annular lip extending substantially axially from the core to the inside surface of the flange, wherein the lip portion includes an outer slant surface inclined radially inwardly as axially extended from a tip of the lip portion toward the outer ring member, wherein the core includes a drain hole formed at the radially lowermost part thereof for draining water entering inside the seal member.

10. A rolling bearing assembly comprising:

an outer ring member;

an inner ring member disposed radially inwardly of the outer ring member in a coaxial relation therewith via rolling elements;

a hub wheel formed with a flange at one axial end thereof and having the inner ring member fitted on an outer periphery thereof; and a seal member for sealing being interposed between one axial end of the outer ring member and an inside surface of the flange axially opposing the one axial end of the outer ring member, the seal member including:

a cylindrical core fitted on the one axial end of the outer ring member and axially extending from the one axial end toward the flange; and an annular lip portion secured to the core and formed from an elastic material, the annular lip extending substantially axially from the core to the inside surface of the flange, wherein the lip portion includes an inner slant surface inclined radially inwardly as axially extended from a tip of the lip portion toward the outer ring member, wherein the core includes a drain hole formed at the radially lowermost part thereof for draining water entering inside the seal member.

* * * * *